United States Patent [19]

Bram

[11] 4,019,057
[45] Apr. 19, 1977

[54] DEVICE FOR DETERMINING THE SPATIAL DISTRIBUTION OF RADIOACTIVITY WITHIN AN OBJECT

[75] Inventor: Stanley Bram, Paris, France

[73] Assignee: Institut Pasteur, France

[22] Filed: Feb. 26, 1975

[21] Appl. No.: 553,109

[30] Foreign Application Priority Data

Apr. 25, 1974 France .............................. 74.14453

[52] U.S. Cl. .............................. 250/375; 250/336; 250/374
[51] Int. Cl.[2] .......................................... G01T 1/18
[58] Field of Search .......... 250/336, 381, 382, 384, 250/389, 374, 375, 335, 385, 393, 394, 395

[56] References Cited

UNITED STATES PATENTS

| | | |
|---|---|---|
| 3,008,051 | 11/1961 | Pocock .............................. 250/381 |
| 3,176,135 | 3/1965 | Lovelock ............................ 250/381 |
| 3,277,296 | 10/1966 | Dimick et al. ..................... 250/381 |
| 3,483,377 | 12/1969 | Borkowski et al. ................. 250/374 |

OTHER PUBLICATIONS

Nuclear Instruments and Methods, 106 (1973) 397–406, North-Holland Publishing Co.

*Primary Examiner*—Archie R. Borchelt
*Attorney, Agent, or Firm*—James & Franklin

[57] ABSTRACT

A method and apparatus designed for the purpose of determining quickly and with high resolution the spatial distribution of radioactivity within an object emitting radioactive particles, especially those of low energy. A gas-filled position sensitive detector is used having an elongated electrode wire enclosed inside of and running the length of the detector. The object is placed inside the detector in close proximity to the wire. An electric circuit means is operably connected to the wire to determine the point along the wire at which an emitted particle is sensed. A two-or three-dimensional spatial distribution can be obtained by using a plurality of such wires.

14 Claims, 8 Drawing Figures

DEVICE FOR DETERMINING THE SPATIAL DISTRIBUTION OF RADIOACTIVITY WITHIN AN OBJECT

The present invention is related to a method and apparatus for determining the spatial distribution of radioactivity in an object, and more particularly to an arrangement for enclosing the object inside the detector.

It has long been known that it is possible to detect and locate radioactivity emanating from the superficial region of an object in several ways. The simplest way involves placing a photographic film in contact with the surface of the object for the relatively long period of time necessary to obtain a darkening. When this sensitive surface is developed, a map of the distribution of radioactivity is obtained. Molecules tagged with radioactive isotopes are often separated by their ability to dissolve or move in a chemical potential (chromatography), by their charge and mobility in an electric field (electrohoresis) or by their size in passing through gels filters or centrifugal fields. Centrifugation or filtration usually yield samples in liquid fractions. Chromatography and electrophoresis are generally carried out in a wet state on a support which is dried after the separation. This radioactive sample is often called an autoradiogram. The resulting solid sample is then cut into thin slices and each slice is analyzed in a liquid scintillation counter to obtain the radioactive distribution. A point by point distribution can also be obtained by scanning over the surface of the object at several points (the number of points being dependent on the resolution required) for a particular time period with a particle detector covered by a narrow slit to measure the radiation intensity at each point. These methods are inconvenient in that they are slow and costly. Specifically, the materials used in chromatography and electrophoresis are expensive and a considerable amount of technician time is required. Also, the film darkening in chromatography requires a lengthy period of time while the resolution with electrophoresis is limited by the thickness of the slices. Furthermore, the sample is destroyed in electrophoresis since it must be sliced, thus preventing its re-use. The point by point scanning is likewise laborious and time consuming and the resolution is limited by the size of the slit. An important deficiency of all these techniques is that due to the length of time involved for analysis of the sample, it is impossible to study certain phenomena in the course of their development, as for example, the diffusion of one substance through another.

Six years ago Borkowski and Kopp patented a position sensitive detector (U.S. Pat. No. 3.483.377) which, according to the present invention, could be adapted to solve such a problem. As in all conventional proportional counter detectors, their system includes a chamber filled with gas containing an anode wire, or collector, bearing a high electrical voltage, for example 1300 volts, with respect to the walls of the chamber, and a circuit for counting and analyzing those electrical impulses generated in the anode due to the electrical discharge provoked by the passage of ionized particles (emitted by the object) in the vicinity of the anode. The amplitude of these impulses is proportional to the energy loss of the particles in the detector gas if the anode is maintained in a certain high voltage range; thus the name proportional counter. The modification developed by Borkowski and Kopp involves the employment of an anode in the form of a high resistance wire held parallel to the window. Each electrical discharge produces an electrical impulse at a point along the anode wire which is sensed at each end of the wire. Since the chamber is, in effect, a capacitance, the amplitude of the electrical impulse sensed at each end of the wire is sujbected to an RC time delay from the time it is first produced at the point due to the capacitance of the chamber and the resistance of the wire. Thus, a certain amount of time is required for the impulse to reach a particular amplitude at the wire ends. By comparing the amount of time required to reach this amplitude at each end, it is possible to find the point along the anode wire at which the electrical/discharge was produced.

The Borkowski-Kopp apparatus was designed and used for measuring the diffusion and diffraction of X-rays, the scattering of thermal neutrons, and for high energy physics, i.e., for the study/of high energy particles all starting from the same point or zone in space. Due to the high penetration of the type of radiation studied by Borkowski and Kopp, the window of the ionizing chamber can consist, for example, of steel or berillium sheet one mm. thick. However, such an apparatus is inadequate to count weakly penetrating particles of low energy, such as those used in biology where the most frequent isotopes are tritium and carbon 14, because such particles will not efficiently penetrate a window with a thickness of one mm. The mere substitution of a much thinner window, however, will not suffice because low energy particles are absorbed or scattered evenby the thinnest windows technologically feasible. Thus, the efficiency of the device, i.e., the ratio of particles detected to particles emitted, would be too low to provide a meaningful result. Also, a thin window is inherently relatively weak. This prevents pressurization of the chamber since the window would freak. Such pressurization is preferred in order to increase resolution of the detector since those errant particles with a high angle of incidence into the detector and thus having to travel a longer distance to/reach the wire will be absorbed by the gas an will not cause an errant reading in/the counter. Only those particles travelling in a direct path, i.e., those having to travel the shortest distance, would not be absorbed, thereby providing a reading with good spatial resolution. For all of the above reasons, the Brokowski-Kapp apparatus and other previously existing position sensitive detectors are clearly inadequate to detect low energy particles isotopes such as $^{125}$I which emit $\gamma$ rays are often used in biochemical and chemical analysis. The energy of the particles emitted by $^{125}$I, for example, is only about one half that of a $^{14}$C electron. However $\gamma$-rays are much more penetrating than electrons and are detected only when they are stopped. Pre-existing position sensitive detectors, even those with 1 cm thick detector cells, will stop and therefore detect only a few percent of the $^{125}$I $\gamma$ rays entering the detector. Pre-existing detectors may be pressurized to increase their efficiency but the interpolation of a thick window will result in a corresponding loss of resolution as the sample-collector distance is increased. Furthermore, a very common type of analysis-double labeling with $^{14}$C and $^{125}$I will not be possible. Often two radioactive isotopes are used in the same autoradiogram and the difference in energy or shape of the resulting discharge is used to distinguish between them. Interpolation of a thick window between the sample and a detector for pressurization prevents such analysis, as electrons will not penetrate.

This would also be the case for $^3H$ and $^{14}C$ double labels. $^{14}C$ electrons may pass, with a low resolution through thin windows but $^3H$ electrons will not. Placing the radioactive object inside the detector eliminates the need for a window and permits such double labelled experiments.

Another type of position sensitive detector has been developped by Kaplan and Coworkers (Nuclear Instruments and Methods 1973,106, 397–406) and has been employed to measure autoradiograms in two dimensions. The detector consist of three grids of parallel wires enclosed in a gas-tight chamber. The spacing between grids varies from 3–10mm and that between wires varies from 1–3 mm depending on the size of the chamber and the spatial resolution required. The center grid, on which the avalanche multiplication occurs, consists of gold-plated tungsten wires typically 15–25 $\mu m$ in diameter; this grid is help at a high positive potential relative to the two outside ones, which are usually held at ground potential. The wires of the central grid are connected to a common bus bar and pulse-height information can be obtained from it.

The two outer grids which are used to obtain the spatial information consist of larger diameter wires, typically 50 $\mu m$ or larger. In order to provide a rectilinear system of coordinates these two grids have their wire axes mutually orthogonal.

The coordinates of an ionizing event are determined by the use of electromagnetic delay lines capacitatively coupled to each of the orthogonal planes of ground grid wires. In these grids we make use of the prompt, positive signals induced on them by the avalanche process after the electrons have been collected on the central grid wires. In order to enable the induced signals on the ground-plane wires to produce a voltage signal of the right shape, these ground grid wires are decoupled from each other and ground through 200 k$\Omega$ isolating resistors.

A signal that indicates the occurrences of an ionizing event is obtained from the central plane through a RC network with a time constant of 500 ns. This signal is processed by the technique of differentiation and zero-crossing and is used to start two time-to eight converters. Similarly processed signals obtained from each delay line are used to stop the converters, one from the x-coordinate line and one from the y-coordinate line.

Their device may effectively be used to measure low resolution autoradiograms of $^{14}C$ or $^3H$ in two dimensions but it is very costly device to measure one dimensional autoradiograms. A computer with memory storage space equal to the square of the one dimensional resolution and two independent sets of electronic timing circuits are necessary. Also the dimensions of the chamber in the Kaplan et al device are typically 200 mm × 200 mm × 5 m which is much larger than a typical one dimensional autoradiogram which are about 100 mm × 10 mm.

For one dimensional autoradiograms we have modified the Kaplan et al device so as to use the only one position sensitive electrode made out of short conductor wires. Furthermore the center grid anode of Kaplan et al detector may be replaced by the set of position sensitive electrodes. The conductor wires are typically about 2 cm long thus 1/10 as long as those generally employed by Kaplan et al. These modifications present the avantages of a simpler construction and serves to reduce the overall thickness and width of the detector chamber. The position sensitive information is obtained as in the Kaplan et al device by the determination of the center of gravity in one direction of the electronic avalanche. Alternatively, the start and stop signals may be taken from both ends of the delay line with the introduction of a variable delay.

It is the general object of the present invention to provide an apparatus for measuring the spatial distribution of radioactivity within an object.

It is the primary object of the present invention to provide an apparatus which will measure the spatial distribution of low energy radioactive particles in an object quickly and with improved resolution.

It is a further object of the present invention to provide position sensitive detectors of a 2-dimensional and even 3-dimensional type with improved spatial resolutions.

Yet another object of the present invention is to provide an apparatus for detecting low energy particles with greater efficiency.

Yet a further object of the present invention is to provide an apparatus enabling the determination of the spatial radioactivity distribution in several discreet radioactive objects with one detector simultaneously.

It is another object of the present invention to provide an apparatus for the determination of $\gamma$-radioactivity with improved efficiency and resolution.

In accordance with these objects, efficient counting of low energy particles and a determination of their spatial distribution with a high spatial resolution is enabled by placing the object inside the detector chamber. A thin, high-resistance wire is fixed within the chamber and functions as an anode with a conductor fixed within the chamber being the cathode. The object is placed in close proximity to the position sensitive electrode and the chamber is then sealed with a strong material to enable pressurization of the chamber beyond atmospheric pressure. Electrical circuitry is then utilized to determine the position along the wire at which a particle is sensed.

To the accomplishment of the above, and to such other objects as may hereinafter appear, the present invention relates to the construction of a device for determining the spatial distribution of radioactivity within an object, as defined in the appended claims and as described in this specification, taken together with the accompanying drawings, in which:

FIG. 2b shows an alternative construction of the detector window of FIG. 2a;and

Radioactive materials such as carbon 14 and tritium are frequently used as markers in biological assays. The spatial distribution of these materials must be accurately determined to obtain a meaningful and useful results. However, such a determination is hindered by the low energy of the emitted radioactive particles which have a relatively short depth of penetration, or ranges. In standard position sensitive detectors, such as the Borkowski-Kopp detector discussed above, the distance from the location of the test sample to the particle detecting element, or collector wire, is too large in relation to the path length of the ionizing particles resulting in a loss of resolution due to errant particles. Also, the window, which is made of solid material semi transparent to radioactive particles, through which the particles must pass into the detector scatters the low energy particles causing an inaccurately registered position. These difficulties are not important in the case of high energy particles for which the pre-existing position sensitive detectors were designed.

Figure 1:
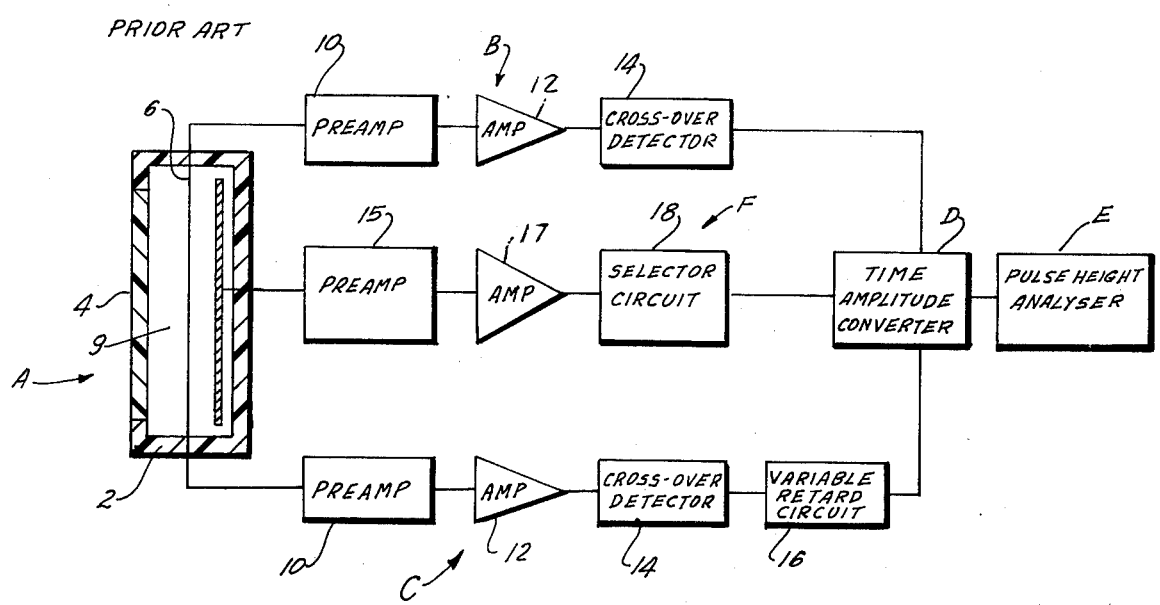
FIG. 1 shows a prior art circuit for determining the spatial distribution of radioactivity in an object.

To eliminate the above-mentioned difficulties, the present invention provides an improved method and apparatus for detecting the particles. However, before proceeding with a description of the primary part of the invention, a brief description of the Borkowski-Kopp circuit will be provided as an example. As shown in FIG. 1, detector A is a solid housing with walls 2 and a window 4 which is transparent to radioactive particles. Detector A contains an anode wire 6 and a conductor 8 which are substantially in parallel with each other within chamber 9. Wire 6 stretches the length of detector A and is connected to circuits B and C at each end, respectively. Circuit B has a preamplifier 10 having its input connected to wire 6 and its output connected to an amplifier 12 which, in turn, has its output connected to a cross-over detector circuit 14. Circuit C has components 10,12 and 14 identical to those in circuit B with the output of the cross-over detector 14 being connected to a variable retard circuit 16. Circuits B and C are connected to a standard time-amplitude converted D which has its output connected to a conventional multi-channel pulse-height analyser E.

In operation, a voltage difference of approximately 1300 V is maintained between wire 6 and conductor 8. Wire 6 is the anode and conductor 8 is the cathode. A gas, conventionally made of a mixture of argon and methane, is introduced into chamber 9. As a radioactive particle enters through window 4, it ionizes the gas surrounding it within the detector. This ionization creates a charge on wire 6 resulting in a pulse of current flowing to each wire an toward circuits B and C, respectively. The high resistance of wire 6 combined with the capacitance of the chamber subjects the pulse to a RC rise time. The pulse is sensed at both ends of the detector by the respective preamplifiers 10 and then amplified by respective amplifiers 12. Cross-over detector circuit 14 is a conventional circuit which generates a signal when the pulse reaches a certain amplitude. Each of circuits B and C will thus generate a signal at a time dependent on how much of the resistance of wire 6 is in the path of the pulse. Clearly if the pulse is in the center, the resistance encountered by the pulse as it travels to each end of wire 6 will be equal, and therefore, the signals generated by the cross-over detectors of circuits B and C coincide. To keep from registering a zero time difference in this situation, retard circuit 16 injects a finite delay so that positive time difference values will always be recorded regardless of which side of the center point senses a particle. Otherwise, plus and minus would be involved depending on which end wire is first reached by the pulse. A positive proportional time difference is thus produced as a function of the position along wire 6 at which a particle is sensed. Time amplitude converter D converts this time difference to an amplitude. Each such amplitude then is registered as a position along a horizontal axis on multichannel analyser E and all the particles counted in each such position are registered along a vertical axis to produce a histogram.

Though this system works satisfactorily for high energy particles, low energy particles are scattered or absorbed by the detector window and by the gas particles between the object and the anode wire, as discussed above. We have found that a significant improvement of the result is obtained by placing the object inside the detector A. Such improvement is due to more efficient counting of the particles, since more of them will reach the wire, and also to better resolution due partly to less scattering and to a reduced sample to collector distance. As to the former, the particle path length is significantly greater than the gap between the object and the wire so the probability of a particle reaching the wire is increased substantially. Also, by no longer having the window between the object and the wire, a significant source of absorption is removed. As to the latter, placement of the object inside the detector enables use of a relatively strong window which is not otherwise possible since it would absorb a large number of particles from an external object. With a strong window, the detector chamber can be pressurized to much more than atmospheric pressure. This increases resolution by eliminating errant particles for the reason mentioned above. Also, with such an arrangement, the particles are continuously within an electric field once emitted from the object. Thus, errant charged particles will be forced to curve toward the wire, thus registering a more accurate position than if they were permitted to travel in a straight line. The electric field has the additional beneficial effect of increasing path length to further improve the count efficiency.

Figure 2A:
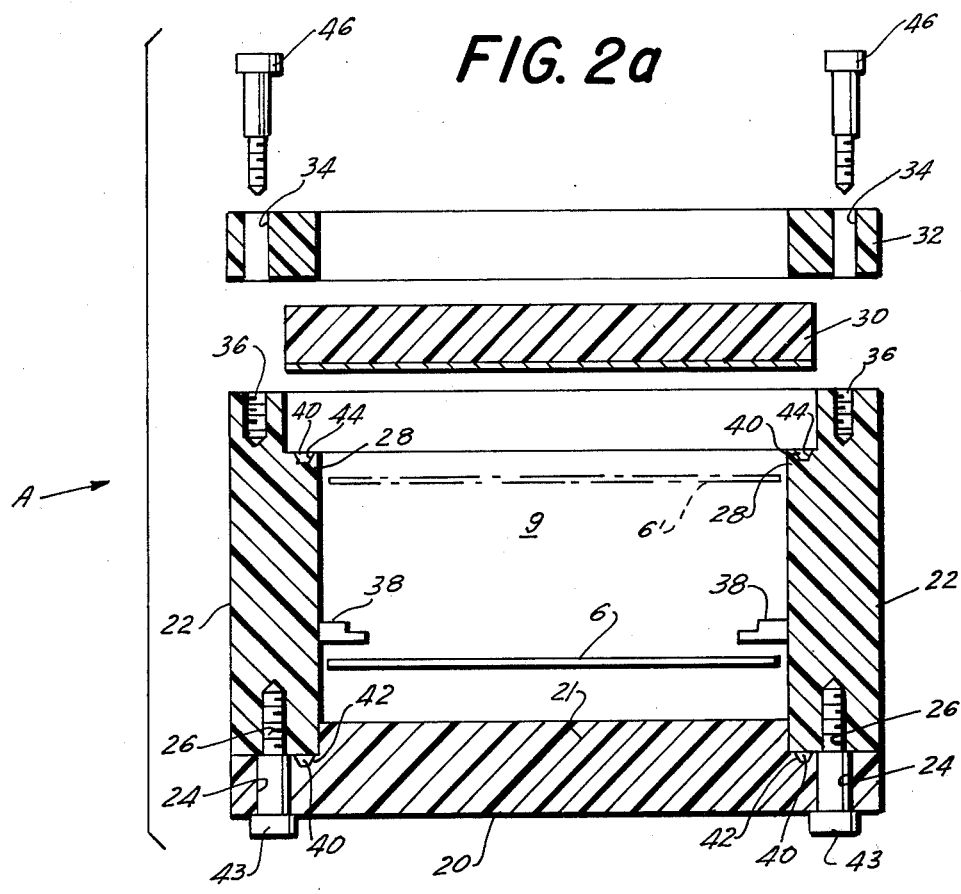
FIG. 2a is a partially exploded cross-sectional elevational view of the detector of the present invention.

The apparatus designed to provide the above advantages is shown in FIG. 2. Detector A has a rectangular base 20 and a frame 22 with both made of non-conductive material. Base 20 has an upwardly protruding portion 21 around which frame 22 fits snugly. A hole 24 in base 20 is aligned with a threaded hole 26 in frame 22. Frame 22 has a step 28 on its inside periphery which supports a window 30. Window 30 is relatively thick and can be made of a conductor, such as either berillium or polycarbonate plastic with an aluminium carbon coating 8' on its inside surface in which case it functions as the cathode 8 in FIG. 1. Alternatively, frame 20 can be made of metal or have a metal coating to function as the cathode instead of using the window coating. A hollow rectangular bar 32 fits over window 30 and has holes 34 at either and aligned with threaded holes 36 in frame 22. Collector wire 6 is fixedly secured with chamber 9 to frame 22 substantially in parallel to base 20 and window 30 by a conventional securing means (not shown). A support 38 is placed in close proximity to each end of collector wire 6 and attached to frame 22 by conventional securing means (not shown). In order to prevent gas leakage, a seal 40 made, for example, of rubber, is placed in notches 42 and 44 along the inside periphery of base 20 and frame 22, respectively.

In assembling the detector, seal 40 is placed in notch 42 of base 20. Base 20 is then secured to frame 22 with screws 43. The collector wire 6 and supports 38 are attached to frame 22 by conventional means and the sample (not shown) is placed onto supports 38. Another seal 40 is then placed in notch 44 of frame 22 and window 30 is lowered into position to engage seal 44. Retaining bar 32 is fastened to frame 22 with screws 46. A gas is then introduced under pressure into detector A. (Gas input lines are not shown). Window 30 is strong enough to withstand pressure significantly higher than atmospheric pressure.

In this configuration, the counting efficiency is significantly increased since the low energy particles need traverse only a short distance to reach the collector wire and thus more of them will be detected. To this end, the wire 6 and supports 38 are preferably so arranged relative to each other that the object is placed as close as is physically possible to wire 6. Also, errant particles will reach the collector wire without having had the opportunity to move significantly far from the point of emission thereby increasing resolution of the result. In addition, the electric filed in the detector will cause errant particles to curve towards the collector wire rather than proceeding in a straight line from the point of emission, thereby registering a signal closer to the point of emission than otherwise would have been the case. In addition, due to the pressure inside the detector, those particles considerably off course will be absorbed by the gas, thereby further increasing resolution. Furthermore, relatively little scattering is involved since the window is not between the sample and the wire.

A still further improvement of the resolution can be attained by electronically sorting those pulses due to errant particles from those providing more accurate data. Since those particles travelling the shortest distance between sample and wire provide the most accurate data, should a particle travel a longer distance, it must be an errant particle. Such a particle, if allowed to reach the analyser E, provides an erroneous reading. Preferably all such errant particles are eliminated. Practically, however, those particles which follow only a slightly deviate path are used nevertheless in order to increase efficiency even at the expense of resolution. Selection circuit F is used to prevent the display of data from particles that are errant beyond a maximum limit. It does so by sensing the pulse magnitude on the wire 6 caused by each particle. Since this magnitude is dependent on the distance travelled by the particle, should this distance exceed a maximum, i.e., the pulse magnitude is below a minimum, circuit F blocks the normal operation of converter B. Specifically, circuit F is comprised of a preamplifier 15 operably connected to wire 6 and to a linear amplifier 17. Selection circuit 18 senses the output of amplifier 17 and if it is below a present value, circuit 18 provides an output signal to converter D to block D from performing its normal operation. Due to all of the above-mentioned factors involved with this device, improvement in resolution is such that radioactivity from spots closer than one or two mms in a chamber 150 mm long can be distinguished without overlap, compared to separations of 6 to 8 mms with previously existing gas detectors.

A further improvement in resolution can be obtained by placing a collimator between the object and the wire. Although this results in a lowered efficiency because the collimator absorbs some particles and also because the separation between object and wire must be increased to accomodate the collimator, a sufficient amount of particles will still be detected as long as the object is inside the detector. This is so because of the effect of the electric field in increasing path length and because practically no other sources of substantial absorption (i.e., the window) intervene.

Figure 2B:
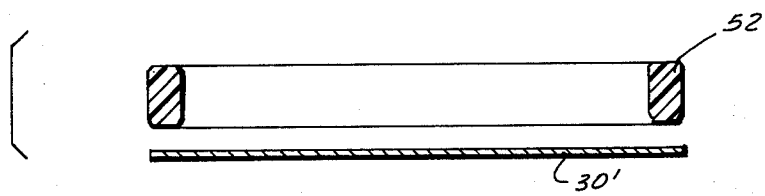
Figure 4:
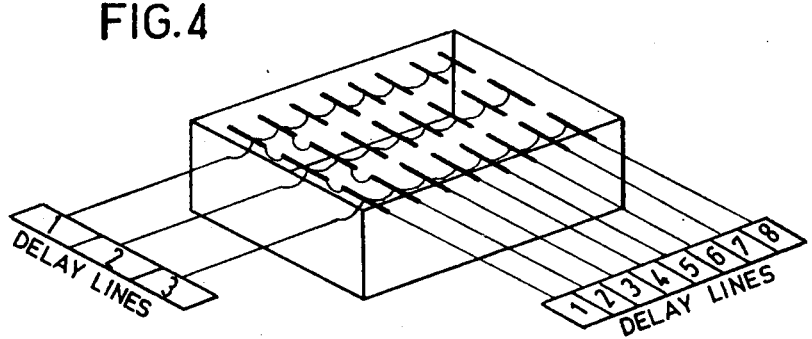
FIG. 4 is a prospective view of the detector showing delay lines set up for use in two dimension spatial distribution determination.
Figure 5:
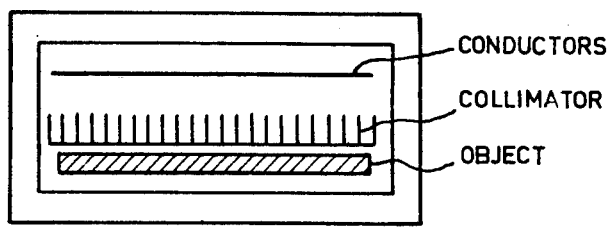
FIG. 5 is a side cross-sectional view showing a collimator situated within the apparatus of the present invention.
Figure 6:
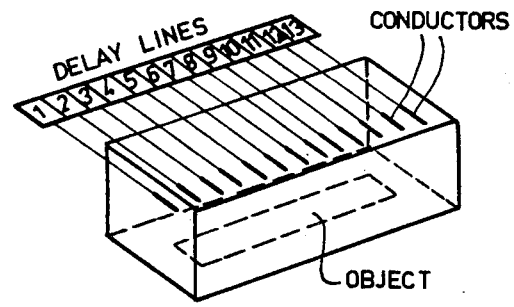
FIG. 6 is an isometric view of the apparatus of the present invention wherein the conductor consists of a series of short parallel conductors, each connected to a delay line.
Figure 7:
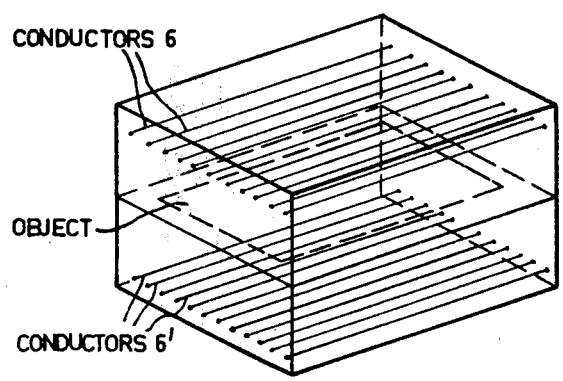
FIG. 7 is an isometric view of an embodiment of the present invention wherein two sets of conductors are utilized, one below and one above the radioactive object.

Although the placement of the test sample inside the detector improves accuracy of the result, it is possible that for some applications it might be considered inconvenient to use. This is because the detector must be pressurized for each sample because the window must be removed to insert the sample. Also, time is required to remove and re-assemble the window. Consequently, an externally positioned test sample might be desirable. This can be achieved by positioning the collector wire as close as is physically possible to window 30 as shown by 6'. In order to enable the low energy particles to be sensed by the wire a window transparent to such particles must be used. Such a window 30' is shown in FIG. 2b and is considerably thinner than the window 30 shown in FIG. 2a and can be made for example of a thin film of polycarbonate plastic. A retaining bar 52 or grid is required to keep window 30' in place. This configuration results in the disadvantages discussed in detail above but the added convenience may make such a situation worthwhile, nevertheless, by employing a supporting grid, thinner windows can be used.

Figure 3:
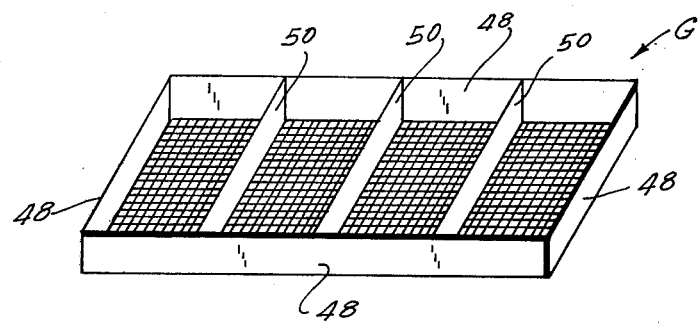
FIG. 3 is a perspective view of a sample tray.

FIG. 3 shows a holder G for supporting a plurality of objects. Sides 48 and walls 50 are made of a material opaque to low energy radiation. The bottom of holder G is a grid which is transparent to low energy particles. Objects placed in holder G are completely isolated from each other by virtue of the opaqueness of walls 50. The apparatus of FIG. 2a easily lends itself to the placement of holder G in chamber 9. With such an arrangement, wire 6 can be used to simultaneously accurately determine the spatial resolution in a plurality of objects, thereby saving considedable time and expense. This holder may be used for some applications outside the chamber above a thin window.

A two-dimensional spatial resolution can be obtained by placing a plurality of wires 6 in parallel to each other in one plane with the plane being in parallel to conductor 8. Another set of such wires 6 in a plane is placed orthogonal to the first set with the respective planes being in parallel. All the wires in each plane are connected electrically in parallel. Thus, a particle is detected by one plane to provide its location in one dimension and by the other plane to provide its location in the second dimension. Another way to provide a two-dimensional reading is to use one set of parallel wires in a plane with a delay line connected to all the wires. The delay line is used to determine which wire 6 detected the particles while each wire is, of course, used to determine the point along it at which the particle was detected. Since both these types of techniques are known in the art, no further details are deemed necessary. Two detector electrodes or sets of electrodes, one above and one below the object, can be employed for the detection of radiation from molecules embedded in thin supports such as papers. This geometry will double the efficiency of the measurement.

It will be apparent from the foregoing that the advantages of the present invention are achieved by placing the sample inside the detector and as close as is physically possible to the anode wire. As a direct result, the efficiency and spatial resolution are significantly improved. Further improvement can be obtained by pressurizing the gas within the detector beyond atmospheric pressure and by eliminating pulses below a certain magnitude with electronic circuitry.

While but two embodiments of the present invention have been here specifically disclosed, it will be apparent that many variations may be made therein, all within the scope of the instant invention as defind in the following claims.

I claim:

1. A method for determination of the spatial distribution of radioactivity in an object, comprising the steps of
   a. placing said object inside the chamber of a position-sensitive radioactivity detector;
   b. sealing said chamber;
   c. introducing a gas into said chamber under pressure significantly higher than atmosphereic pressure;
   d. sensing the location within said chamber of a particle emitted by said object; and
   e. counting and displaying the number of such particles sensed at a plurality of locations within said detector.

2. The method of claim 1, further comprising the step of eliminating those particles which do not travel at an angle substantially perpendicular to said object.

3. The method of claim 1, wherein a plurality of objects are placed inside said chamber and the spatial distribution of radioactivity in all said objects is determined simultaneously.

4. The method of claim 1, wherein said spatial distribution is determined for more than one dimension.

5. In an apparatus for determining the spatial distribution of the radioactivity in an object, the combination comprising a detector having a completely enclosed chamber containing a ionizable gas, at least a portion of one wall of said chamber being removable, an elongated conductor extending longitudinally of and fixedly secured within said chamber, a support attached inside said chamber to said chamber walls in close proximity to said elongated conductor, said support being adapted to mount said object in close proximity and substantially in parallel to said elongated conductor, means operatively connected to said elongated conductor for determining the location along said elongated conductor of radioactive particles emitted by said object and reaching the proximity of said location, means connected to said determining means for counting the number of said particles at each one of a plurality of said locations, and a display device connected to the output of said counting means.

6. The apparatus of claim 5, wherein said removably fastened chamber wall portion is made of a relatively thick material strong enough to withstand pressures significantly higher than atmospheric pressure.

7. The apparatus of claim 6, wherein said gas is under pressure significantly higher than atmospheric pressure.

8. The apparatus of claim 5, further comprising a collimator placed between said object and said elongated conductor.

9. The apparatus of claim 5, further including means connected to said counting means for preventing the counting of those particles not travelling at an angle substantially perpendicular to said object.

10. The apparatus of claim 5, further comprising a holder mounted on said support comprised of a bottom surface which is transparent to radiation and a plurality of spaced walls impenetrable to radiation, and wherein said holder is adapted to support a plurality of said objects within said chamber with each object resting on said bottom surface between adjacent walls.

11. The apparatus of claim 5, wherein a plurality of said elongated conductors are fixedly attached to said chamber walls parallel to each other in a plane and further including a delay line operatively connected to said plurality of elongated members, said determining means being operatively connected to said conductors and to said delay line, whereby a two-dimensional spatial distribution is obtained.

12. The apparatus of claim 5, wherein said elongated conductor consists of a series of short parallel conductors each connected to a delay line.

13. The apparatus of claim 5, wherein two sets of detecting electrodes and electronics, one above and one below the radioactive object, are placed so as to detect radiation emitted in directions both above and below the object.

14. The apparatus of claim 12 wherein a plurality of said elongated conductors are fixedly attached to said chamber walls parallel to each other in a plane and further including a delay line operatively connected to said plurality of said elongated members, said determining means being operatively connected to said conductors and to said delay line, whereby a two-dimensional spatial distribution is obtained.

* * * * *

REEXAMINATION CERTIFICATE (274th)
United States Patent [19]

Bram

[11] B1 4,019,057

[45] Certificate Issued Nov. 20, 1984

[54] DEVICE FOR DETERMINING THE SPATIAL DISTRIBUTION OF RADIOACTIVITY WITHIN AN OBJECT

[75] Inventor: Stanley Bram, Paris, France

[73] Assignee: Institut Pasteur, France

Reexamination Request:
No. 90/000,419, Jul. 14, 1983

Reexamination Certificate for:
Patent No.: 4,019,057
Issued: Apr. 19, 1977
Appl. No.: 553,109
Filed: Feb. 26, 1975

[30] Foreign Application Priority Data

Apr. 25, 1974 [FR] France .................................. 74.14453

[51] Int. Cl.³ .................................................. G01T 1/18
[52] U.S. Cl. .................................... 250/375; 250/336; 250/374
[58] Field of Search ............... 250/335, 336, 374, 375, 250/381, 382, 384, 385, 389, 393, 394, 395

[56] References Cited
PUBLICATIONS

Pullan et al, "Measuring Radionuclide Distribution With Cross-Wire Spark Chambers", *Nuclionics*, vol. 24, pp. 72–75, Jul. 1966.
Kaplan et al, "Multiwire Proportional Chambers for BioMedical Application", *Nuclear Instruments and Methods*, vol. 106, pp. 397–406, 1973.
Prydz, "Summary of the State of the Art in Radio Chromotography", *Analytical Chemistry*, vol. 45, No. 14, pp. 2317–2326, Dec. 1973.

*Primary Examiner*—Janice A. Howell

[57] ABSTRACT

A method and apparatus designed for the purpose of determining quickly and with high resolution the spatial distribution of radioactivity within an object emitting radioactive particles, especially those of low energy. A gas-filled position sensitive detector is used having an elongated electrode wire enclosed inside of and running the length of the detector. The object is placed inside the detector in close proximity to the wire. An electric circuit means is operably connected to the wire to determine the point along the wire at which an emitted particle is sensed. A two- or three-dimensional spatial distribution can be obtained by using a plurality of such wires.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–14 is confirmed.

* * * * *